United States Patent
Hung

(10) Patent No.: US 11,573,038 B2
(45) Date of Patent: *Feb. 7, 2023

(54) METHODS AND SYSTEMS FOR OPERATING HVAC SYSTEMS IN LOW LOAD CONDITIONS

(71) Applicant: Lennox Industries Inc., Richardson, TX (US)

(72) Inventor: Der-Kai Hung, Dallas, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/376,392

(22) Filed: Jul. 15, 2021

(65) Prior Publication Data

US 2021/0341197 A1 Nov. 4, 2021

Related U.S. Application Data

(60) Continuation of application No. 16/459,847, filed on Jul. 2, 2019, now Pat. No. 11,092,368, which is a
(Continued)

(51) Int. Cl.
*F25B 49/02* (2006.01)
*F25B 5/00* (2006.01)
(Continued)

(52) U.S. Cl.
CPC ............. *F25B 49/02* (2013.01); *F25B 5/00* (2013.01); *F25B 13/00* (2013.01); *F25B 41/20* (2021.01);
(Continued)

(58) Field of Classification Search
None
See application file for complete search history.

(56) References Cited

U.S. PATENT DOCUMENTS

| 4,494,382 A | 1/1985 | Raymond |
| 4,779,425 A | 10/1988 | Yoshihisa et al. |

(Continued)

FOREIGN PATENT DOCUMENTS

| CN | 203687235 U | 7/2014 |
| EP | 0282782 A2 | 9/1988 |

(Continued)

OTHER PUBLICATIONS

European Patent Office, Communication for Application No. 15196149.7-1602 10 pages, dated Jun. 29, 2016, Received Jul. 8. 2016.
(Continued)

*Primary Examiner* — Jenna M Hopkins
(74) *Attorney, Agent, or Firm* — Baker Botts L.L.P.

(57) ABSTRACT

A system comprising a compressor, a first valve coupled to the compressor and coupled to a first coil, a first expansion valve coupled to the first coil, a second coil, and a second expansion valve. The second expansion valve coupled to a third coil, a second valve coupled to the compressor and the third coil. A controller operable to operate the first valve, the first expansion valve, the second expansion valve, and the second valve. The second coil is coupled to the compressor and the refrigerant flows from the second coil to the compressor.

20 Claims, 4 Drawing Sheets

Related U.S. Application Data division of application No. 14/930,291, filed on Nov. 2, 2015, now Pat. No. 10,365,025.

(60) Provisional application No. 62/084,492, filed on Nov. 25, 2014.

(51) Int. Cl.
  *F25B 13/00* (2006.01)
  *F25B 41/20* (2021.01)
  *F25B 29/00* (2006.01)
  *F25B 41/39* (2021.01)
  *F25B 41/385* (2021.01)

(52) U.S. Cl.
  CPC .......... *F25B 29/003* (2013.01); *F25B 41/385* (2021.01); *F25B 41/39* (2021.01); *F25B 2313/007* (2013.01); *F25B 2313/0253* (2013.01); *F25B 2313/0254* (2013.01); *F25B 2313/0294* (2013.01); *F25B 2313/02743* (2013.01); *F25B 2600/0253* (2013.01); *F25B 2600/07* (2013.01); *Y02B 30/70* (2013.01)

(56) References Cited

U.S. PATENT DOCUMENTS

| | | | |
|---|---|---|---|
| 4,862,705 | A | 9/1989 | Nakamura et al. |
| 5,682,752 | A | 11/1997 | William |
| 5,823,006 | A | 10/1998 | Jung |
| 8,683,817 | B2 | 4/2014 | Fraser |
| 9,599,353 | B2 | 3/2017 | Cur et al. |
| 9,816,721 | B2 | 11/2017 | Towsley |
| 10,001,294 | B2 | 6/2018 | Kawai et al. |
| 10,029,538 | B2 | 7/2018 | Kawamoto et al. |
| 10,101,043 | B2 | 10/2018 | Bellamy, Jr. |
| 2003/0070441 | A1 | 4/2003 | Moon et al. |
| 2004/0134205 | A1 | 7/2004 | Park et al. |
| 2006/0185373 | A1 | 8/2006 | Butler et al. |
| 2008/0022710 | A1 | 1/2008 | Ho et al. |
| 2008/0134699 | A1 | 6/2008 | Leaver et al. |
| 2008/0149655 | A1 | 6/2008 | Gist et al. |
| 2010/0319376 | A1 | 12/2010 | Kawano et al. |
| 2011/0023533 | A1 | 2/2011 | Shimazu |
| 2011/0174002 | A1 | 7/2011 | Jang et al. |
| 2012/0055184 | A1 | 3/2012 | Ueda |
| 2012/0090337 | A1 | 4/2012 | Chen et al. |
| 2013/0145785 | A1 | 6/2013 | Nobuhiro |
| 2013/0145786 | A1 | 6/2013 | Tamaki et al. |
| 2014/0026601 | A1 | 1/2014 | Chen et al. |
| 2014/0048244 | A1 | 2/2014 | Wallace |
| 2015/0068241 | A1 | 3/2015 | Sun et al. |
| 2015/0285539 | A1 | 10/2015 | William |
| 2016/0178261 | A1 | 6/2016 | Kimura et al. |
| 2017/0211853 | A1 | 7/2017 | Feng et al. |

FOREIGN PATENT DOCUMENTS

| | | |
|---|---|---|
| EP | 1437557 A1 | 12/2003 |
| EP | 2339268 A2 | 11/2010 |
| EP | 2574866 A2 | 4/2013 |
| KR | 20130066499 A | 6/2013 |
| WO | 2014083867 A1 | 6/2014 |
| WO | 2015059792 A1 | 4/2015 |

OTHER PUBLICATIONS

Low-Load High Performance Homes Introduction and HVAC Solutions—Ueno (2013).
Review of Residential Low-Load HVAC Systems—Brown (2013).
European Patent Office, Communication pursuant to Article 94(3), Application No. 15196149.7, dated Dec. 11, 2019, 4 pages.
European Patent Office, Communication pursuant to Article 94(3), Application No. 15196149.7, dated Jun. 18, 2020, 5 pages.

METHODS AND SYSTEMS FOR OPERATING HVAC SYSTEMS IN LOW LOAD CONDITIONS

RELATED APPLICATION

This application is a continuation of U.S. application Ser. No. 16/459,847 filed Jul. 2, 2019, which is a divisional of U.S. application Ser. No. 14/930,291 filed Nov. 2, 2015, which claims benefit under 35 U.S.C. § 119(e) of U.S. Provisional Application No. 62/084,492 filed Nov. 25, 2014. These applications are incorporated herein by reference.

TECHNICAL FIELD

This application is directed, in general, to HVAC (heating, ventilating, and air conditioning) systems, and more specifically to HVAC systems for operating in low load conditions.

BACKGROUND

HVAC systems often need to be able to operate across a range of system loads. Present HVAC systems operate ineffectively or not at all in low load conditions. Thus, methods and systems are needed for HVAC systems to operate effectively in low load conditions.

SUMMARY OF THE DISCLOSURE

A system comprising a compressor operable to compress refrigerant, a first valve coupled to the compressor and coupled to a first coil, a first expansion valve coupled to the first coil, a second coil, and a second expansion valve is disclosed. In the system, the second expansion valve is further coupled to a third coil, a second valve is coupled to the compressor and the third coil. Further, a controller operable to, in response to receiving a cooling demand that is below a threshold cooling demand, operate the first valve to direct the refrigerant from the compressor into the first coil, operate the first expansion valve to direct a first amount of the refrigerant from the first coil to the second coil and a second amount of the refrigerant from the first coil to the second expansion valve, operate the second expansion valve to direct the second amount of the refrigerant to the third coil, and operate the second valve to direct the second amount of refrigerant from the third coil to the compressor is disclosed. In the system, the second coil is coupled to the compressor and the first amount of the refrigerant flows from the second coil to the compressor.

The present embodiment presents several technical advantages. First, the present embodiment discloses an HVAC system that operates efficiently in both low load conditions and regular load conditions. Second, the present embodiment can effectively cool or heat an environment in low or regular load conditions. Third, the present embodiment provides flexibility for controlling the climate of an environment using an intelligent controller.

Certain embodiments of the present disclosure may include some, all, or none of these advantages. One or more other technical advantages may be readily apparent to those skilled in the art from the figures, descriptions, and claims included herein.

BRIEF DESCRIPTION OF THE DRAWINGS

For a more complete understanding of the present disclosure and the advantages thereof, reference is now made to the following Detailed Description taken in conjunction with the accompanying drawings, in which.

DETAILED DESCRIPTION

Figure 1:
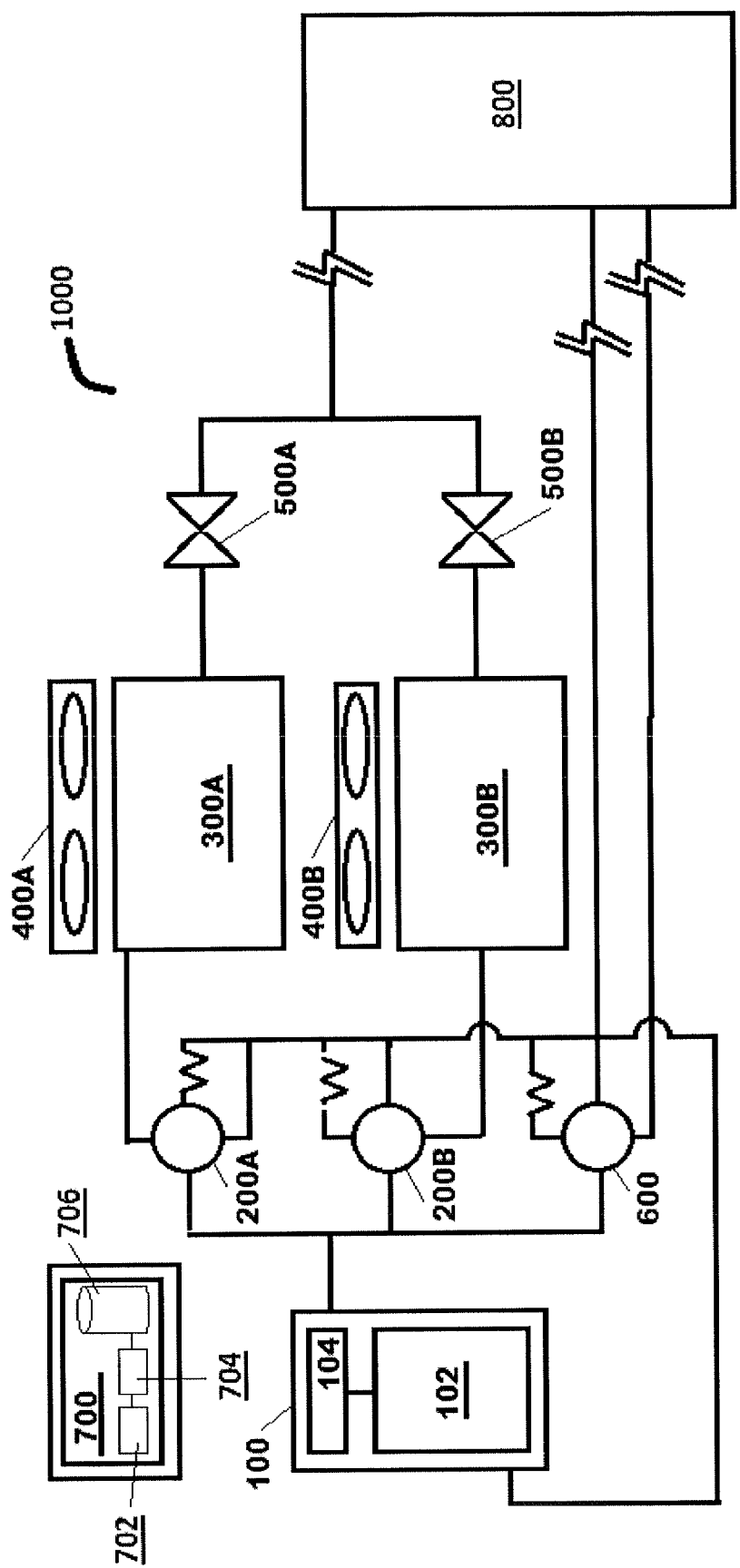
FIG. 1 is a block diagram of an outdoor section of a VRF system.

Variable Refrigerant Flow (VRF) systems are a type of HVAC system consisting of multiple indoor units and one or more outdoor units. VRF systems may be configured for heat pump operation, capable of providing either heating or cooling supply air to a conditioned space through use of a reversing valve to change the direction of refrigerant flow through VRF system components.

Each indoor unit of a VRF system comprises an indoor coil and is configured to condition supply air for delivery to a specific zone of conditioned space within a building. Each indoor unit of a VRF system may be paired with one or more outdoor units, forming one or more refrigerant flow circuits. Each outdoor unit may comprise one or more outdoor coils. Each of the multiple indoor units of a VRF system operates to provide conditioned air to a specific, and separate, zone within a building. Each indoor unit may operate independently of the other indoor units, such that some, none, or all of the indoor units may be in operation simultaneously.

A particular type of VRF system, a 3-pipe VRF system, has the additional capability of operating one or more indoor units to provide cooling air while simultaneously operating one or more other indoor units to provide heating air. When operating under simultaneous heating and cooling demand conditions, the VRF system uses routes refrigerant flow through the system so that indoor coils in heating mode function as a condenser unit providing sub-cooled liquid refrigerant to indoor coils operating in cooling mode. In this manner, the individual heating and cooling demands of multiple zones within a building having a 3-pipe VRF system may be accommodated.

VRF systems are designed to operate efficiently in part load, or less than full capacity, conditions through adjustment of the overall heating or cooling capacity of the system to match the combined demand of all of the indoor zones. For example, in a VRF system having two indoor units providing conditioned supply air to two distinct zones of conditioned space within a building, the first zone may be operating at full load cooling demand while there may be no demand for conditioned supply air in the second zone. Under such conditions, the total system demand may be equal to approximately half of the system's full load cooling capacity. To operate more efficiently, the VRF system may respond to such conditions by retarding system cooling capacity to match the combined demand experienced among the several indoor zones.

The VRF system may match the cumulative demand of the conditioned spaces within a building through adjustment of the flow rate of refrigerant circulated through the system components. The refrigerant flow rate may be adjusted through use of a multispeed, or variable speed, compressor. Such compressors are commonly implemented with an inverter, or variable-speed, drive to vary the compressor speed through variation of the frequency and voltage of power applied to the compressor motor.

Unfortunately, control of VRF system capacity in this way is limited by the operating range of the variable, or multi-speed, compressor. Commonly, inverter equipped variable speed compressors are incapable of operating at speeds corresponding to extra low system capacity ranges. For example, a particular variable speed compressor implemented with an inverter may be limited to an operating RPM range of between 20% and 100% of full speed operation. In a VRF system implemented with such a compressor, system demands of below approximately 20% may not be met by the VRF system since the compressor may not be energized at speeds below its operating range. Alternatively, the compressor may be energized at its lowest speed setting, causing the VRF system to inefficiently provide conditioned air at a capacity higher than demanded. Operation in this manner also leads to rapid power cycling of the compressor during extra low load operation, reducing the life of the compressor.

In VRF systems, in particular, extra low demand for conditioned supply air is common, as one or more zones may experience a low, or partial load, demand for conditioned supply air while other zones may simultaneously place no demand for conditioned supply air on the system. Under such conditions, the extra low cumulative system demand from all zones may correspond to compressor operation at a speed below the operational range of the compressor, rendering the system incapable of comfortably, efficiently, and reliably accommodating the cooling and heating demands on the VRF system. A need exists for a VRF system capable of operation in extra low load conditions. Specifically, a need exists for a VRF system capable of accommodating a greater range of system demand, with the range not limited at its lower end by the operating capabilities of the system compressor.

In the following discussion, numerous specific details are set forth to provide a thorough understanding of the present disclosure. However, those skilled in the art will appreciate that the present embodiment may be practiced without such specific details. Additionally, for the most part, details concerning any well-known features and elements have been omitted inasmuch as such details are not considered necessary to obtain a complete understanding of the present disclosure, and are considered to be within the understanding of persons of ordinary skill in the relevant art.

Referring to FIG. 1, a block diagram of the outdoor section components and piping arrangement of VRF system 1000 according to an embodiment of the present embodiment is shown. The VRF system 1000 may be a three pipe VRF unit configured for heat pump operation and comprising a single outdoor unit, having two outdoor coils, coupled with one or more indoor units (not shown). The VRF system 1000 may include a compressor assembly 100, two valves 200A and 200B, two outdoor coils 300A and 300B, two fan assemblies 400A and 400B, two metering device 500A and 500B, a reversing valve 600, a controller 700, and an indoor coil 800.

Although the embodiment shown in FIG. 1 corresponds to simplified system components and piping for a single refrigerant flow circuit, the apparatus and method described herein may be utilized in multi-stage VRF systems having multiple refrigerant flow circuits.

In alternative embodiments, VRF system 1000 may include additional, fewer, or different components than those shown in FIG. 1. For example, in an alternative embodiment, VRF system 1000 may be provided with more than one compressor 100, with more than two valves 200, more than two outdoor coils 300, more than two fan assemblies 400, with more than two metering devices 500, with more than one reversing valve 600, and/or with more than one indoor coil 800, and the like. The VRF system 1000 may, in alternative embodiments, be provided with additional components and associated piping, such as one or more oil separators, one or more crankcase heaters, one or more check valves, one or more refrigerant accumulators, one or more pressure and/or temperature sensors, and the like.

Further, VRF system 1000 components may be located in different sections of the VRF 1000 system than shown. For example, some, none, or all of the system components such as the compressor 100, the valves 200, the metering devices 500, the reversing valve 600, and the controller 700 may be located elsewhere in the VRF system 1000, such as in an indoor section, for example, and not within the outdoor section.

As shown in FIG. 1, the VRF system 1000 may include a compressor assembly 100 for pumping refrigerant from the low pressure to the high pressure sides of a VRF system 1000. The compressor assembly 100 may be configured to pump refrigerant through the VRF system 1000 at a variable flow rate, configured to match VRF system 1000 demand. The compressor assembly 100 may operatively connect to, and receive power and control signals from, the system controller 700.

The compressor assembly 100 may comprise a compressor 102 operatively coupled to a variable speed drive 104 for varying the speed of the compressor 102. The compressor 102 may be of any type, such as a scroll compressor, a reciprocating compressor, or the like. Compressor 102 may be any device for compressing refrigerant.

The variable speed drive 104 may adjust the speed of the compressor 102, varying the flow rate of refrigerant through the compressor 102. The variable speed drive 104 may adjust the compressor 102 speed through any suitable method, such as through frequency modulation of an incoming power signal, voltage modulation of an incoming power signal, or other suitable methods. In an alternative embodiment than that shown in FIG. 1, the variable speed drive 104 may be an internal component of the compressor 102 or, alternatively, incorporated within the system controller 700.

The VRF system 1000 may include valves 200A and 200B for routing refrigerant flow received from compressor assembly 100 through the VRF system 1000. As shown in FIG. 1, the valves 200A and 200B may each be four-way valves configured to route refrigerant flow through the valve 200 along one of two paths, as desired. The valves 200A and 200B may be any other type of suitable valves. The valves 200A and 200B may be operatively connected to the system controller 700 for receiving control signals setting the position of valves 200A and 200B. In an alternative embodiment, the valves 200A and 200B may be replaced with a series of shutoff valves, check valves, or the like, and configured to permit refrigerant flow along a desired path. As shown in FIG. 1, the valve 200A may be paired with the outdoor coil 300A while the valve 200B may be paired with the outdoor coil 300B. This configuration may allow for refrigerant flow to be directed from the discharge of the compressor assembly 100 to either, or both, of the outdoor coils 300A and 300B, depending on the heating or cooling demand to which the VRF system 1000 is operating in response to.

Returning to FIG. 1, the VRF system 1000 may include outdoor coils 300A and 300B and indoor coil 800. Outdoor coils 300A and 300B and indoor coil 800 may allow for heat transfer between VRF system 1000 refrigerant and the outdoor air passing over the outdoor coils 300A and B and indoor coil 800. In an embodiment, the size, shape, piping configuration, and/or heat transfer capacity of the outdoor coils 300A and 300B and indoor coil 800 may be equal. Alternatively, in an embodiment, one or more outdoor coils 300 and indoor coil 800 may vary in size, shape, piping configuration, and/or heat transfer capacity from each other.

The VRF system 1000 may include fans 400A and 400B. The fans 400A and 400B may induce airflow across the outdoor coils 300A and 300B. The fans 400A and 400B may include a plurality of blades that may be rotated about a hub in response to a control signal input to a motor. The fans 400A and 400B may be configured to operate at different speeds and in one of two directions, as desired, to push air across, or draw air through, the outdoor coils 300A and 300B. In some embodiments, one or more indoor fans may also induce airflow across indoor coil 800.

As shown in FIG. 1, the fan 400A may be paired with the outdoor coil 300A while the fan 400B may be paired with the outdoor coil 300B. In alternative embodiments, more or fewer fans 400 may be provided. For example, in an embodiment, a single fan 400 may be provided for inducing airflow across all of the outdoor coils 300. In an alternative embodiment, each outdoor coil 300 may be paired with multiple fans 400. In such an embodiment, the fans 400 may be controlled by the system controller 700 independently, or in concert.

The fans 400A and 400B may be operably connected to, and may receive control and power signals from, the system controller 700 via a wired or wireless connection. The fans 400A and 400B may be configured for variable speed operation in response to heating and cooling demand on the VRF system 1000. The fans 400A and 400B may be operated, for example, at higher speed to induce more airflow over the outdoor coils 300A and 300B to increase the rate of heat transfer between the VRF system 1000 refrigerant and the outdoor air to accommodate higher heating or cooling demand on the VRF system 1000. Conversely, the fans 400A and 400B may be operated at lower speeds, or, in a further alternative, turned off, in response to lesser heating or cooling demand on the VRF system 1000.

The electrical input to the fans 400A and 400B may be a direct current (DC) input or an alternating current (AC) input. The control signal may be a pulse-width modulated (PWM) signal in which the relative width of pulses determines the level of power applied to the fans 400A and 400B. The revolutions per minute (RPM) of the fans 400A and 400B may have a direct relationship to the width of PWM pulses. Alternatively, the control signal may be the power applied to the fans 400A and 400B which may be switched on and off, with the controller 700 setting the amplitude of the power signal to control the speed of the fans 400A and 400B. Alternatively, the speed of the fans 400A and 400B may be controlled using any suitable methods of fan speed control.

As shown in FIG. 1, the VRF system 1000 may include two metering devices 500A and 500B for controlling the rate of refrigerant flow between VRF system 1000 components and causing a pressure drop of the refrigerant fluid as part of the vapor compression cycle. Either or both of the metering devices 500A and 500B may be expansion valves. These expansions valves may be of any suitable type including electronic expansion valves (EXV). The expansion valves may any valves that regulate the flow of the refrigerant fluid inside VRF system 1000.

In an embodiment, the metering devices 500A and 500B may both be EXVs which may each be operatively connected to, and receive control signals from, the system controller 700 by a wired or wireless connection. The system controller 700 may control each metering device 500A and 500B, adjusting the size of the opening through the metering devices 500A and 500B that refrigerant may flow in response to the heating or cooling demand on the VRF system 1000 and using sensed refrigerant temperature and pressure data.

In the embodiment shown, for example, the controller 700 may command one, or both, metering devices 500A and 500B to the fully open position during normal, full load, cooling operation. Similarly, in the embodiment shown, the controller 700 may command one, or both, metering devices 500A and 500B to a partially open position, or a closed position, during partial load cooling operation. Further, in the embodiment shown, for example, the controller 700 may command one, or both, metering devices 500A and 500B to a fully open, partially open, or fully closed position to adjust the rate of refrigerant flow through each, or both, metering devices 500 during heating operation.

In an alternative embodiment, one, or both, metering devices 500 may be replaced with a combination of components configured to perform the refrigerant metering function as described herein, and below. In a particular embodiment, for example, the metering devices 500A and/or 500B functions may be performed by a check valve and a short orifice or TXV arranged in parallel with one another, whereby one, or both, check valves may be opened, or closed, to selectively allow refrigerant flow to bypass the short orifices or TXVs in response to specific operating conditions of the VRF system 1000.

In a VRF system utilizing one or more check valve and TXV, or check valve and short orifice, metering device 500 combinations, one or more check valves may be in the open position, allowing the refrigerant flow to bypass the corresponding TXV or short orifice components during normal cooling operation. In a VRF system utilizing one or more check valve and TXV, or check valve and short orifice, metering device 500 combinations, one or more check valves may be in the closed position, forcing refrigerant flow through the corresponding TXV or short orifice components during heating operation.

The VRF system 1000 may include a reversing valve 600 for setting the direction of flow of refrigerant in the VRF system in one of two directions, as desired, and in accordance with any suitable methods of heat pump operation. The reversing valve 600 may be a four way valve of any type of suitable valve. The reversing valve 600 may be operatively connected to the system controller 700 via a wired or wireless connection.

The VRF system 1000 may be provided with a system controller 700 for controlling operation of VRF system 1000 components, including the compressor assembly 100 components, the valves 200A and 200B, the fans 400A and 400B, the metering devices 500A and 500B, and the reversing valve 600, as well as other components comprising the VRF system 1000 not shown in FIG. 1. The controller 700 may be connected to the VRF system 1000 components via wired or wireless connections. The controller 700 may be implemented with hardware, software, or firmware defining methods of VRF system 1000 control operation. Further, the controller 700 may be implemented with logic for VRF system 1000 control during extra low heating or cooling demand in accordance with the method shown in FIG. 2.

System controller 700 may have an interface 702, processor 704, and memory 706 for performing the functions of system controller 700. The system controller 700 memory may store VRF system 1000 characteristics including a low heating demand threshold and a low cooling demand threshold in memory 706. Memory 706 may include any one or a combination of volatile or non-volatile local or remote devices suitable for storing information. For example, memory 706 may include RAM, ROM, flash memory, magnetic storage devices, optical storage devices, network storage devices, cloud storage devices, solid state devices, or any other suitable information storage device or a combination of these devices. Memory 706 may store, either permanently or temporarily, data, operational software, other information for system controller 700. Memory 706 may store information in one or more databases, file systems, tree structures, relational databases, any other suitable storage system, or any combination thereof. Furthermore, different information stored in memory 706 may use any of these storage systems. The information stored in memory 706 may be encrypted or unencrypted, compressed or uncompressed, and static or editable. Memory 706 may store information in one or more caches.

Interface 702 may receive and transmit signals and inputs from and to users, remote sensors, or any other component of VRF system 1000. Interface 702 may also communicate with processor 704 and memory 706. Interface 702 may be any port or connection, real or virtual, including any suitable hardware and/or software, including protocol conversion and data processing capabilities, to communicate through a LAN, WAN, or other communication system that allows system controller 700 to exchange information with any user or component of VRF system 1000. For example, interface 702 may be operable to receive temperature information or pressure information from remote temperature and pressure sensors. A temperature sensor may be any thermometer or other temperature sensing device. The temperature sensor may be alcohol based, mercury based or based on any other suitable material.

Processor 704 may be any electronic circuitry, including, but not limited to microprocessors, application specific integrated circuits (ASIC), application specific instruction set processor (ASIP), and/or state machines, that communicatively couples interface 702 and memory 706 and controls the operation of system controller 700. In some embodiments, processor 704 may be single core or multi-core having a single chip containing two or more processing devices. Processor 704 may be 8-bit, 16-bit, 32-bit, 64-bit or of any other suitable architecture. Processor 704 may comprise an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 704 may include other hardware and software that operates to control and process information. Processor 704 may execute computer-executable program instructions stored in system controller 700 memory. Processor 704 may not be limited to a single processing device and may encompass multiple processing devices.

Figure 2:
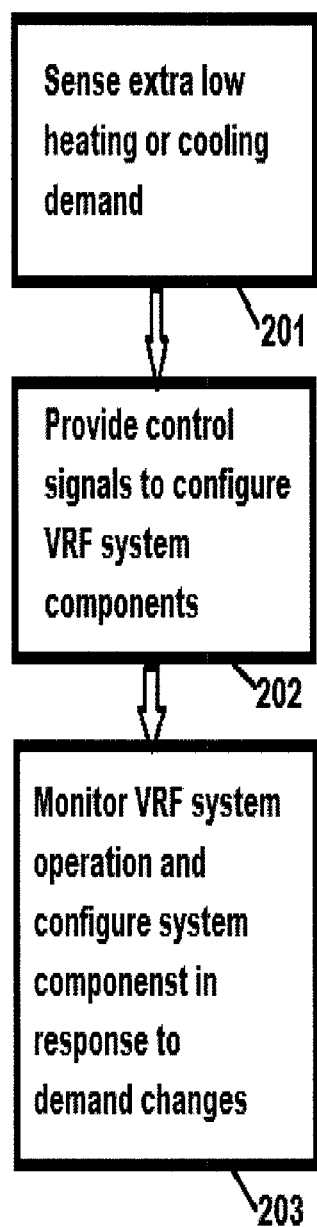
FIG. 2 is a flow chart of a method of control of metering valves by a system controller.

Turning now to FIG. 2, the controller 700 may control the VRF system 1000 components according to the flowchart shown in FIG. 2. At step 201, the controller 700 may sense extra low demand on the VRF system 1000. The controller 700 may sense extra low demand based on several input sources to the controller 700, such as data from sensors, user input at the system controller 700 or thermostat, system component operational capabilities, stored data and functions within the controller 700, and the like.

At step 201, the controller 700 may further determine whether the sensed extra low demand is extra low heating or cooling demand. At step 202, the controller may provide control signals setting the position of several system components, which may include the compressor assembly 100, the valves 200, the fans 400, the metering devices 500, and the reversing valve 600 to configure the VRF system for operation to meet the sensed demand.

At step 202, for example, the controller 700 may respond to sensing extra low cooling demand by providing control signals to the VRF system 1000 components as follows: (1) the valves 200A and B may be positioned to route refrigerant flow from the compressor assembly 100 discharge to only outdoor coil 300A; (2) the metering device 500A may be commanded to the fully open position; (3) the metering device 500B may be commanded to a partially open position; (4) the fans 400 speeds may be set to desired speeds; (5) the reversing valve 600 may be positioned for cooling operation; and (6) the compressor assembly 100 may be configured to operate at its lowest speed setting.

With the VRF system 1000 components configured as described, a portion of the refrigerant flow of the VRF system 1000 may be routed through the outdoor coil 300B to induce an artificial cooling load. The artificial load induced into the VRF system 1000 may increase total VRF system 1000 cooling demand to above the cooling capacity corresponding to operation of the compressor assembly 100 at its lowest speed setting.

Alternatively, at step 202, for example, the controller 700 may respond to sensing extra low heating demand by providing control signals to the VRF system 1000 components as follows: (1) the valves 200A and B may be positioned to allow some refrigerant flow from the compressor assembly 100 discharge to flow directly to the outdoor coil 300A, while preventing any refrigerant flow from the compressor assembly 100 discharge from flowing directly to the outdoor coil 300B; (2) the metering device 500A may be commanded to a partially open position; (3) the metering device 500B may be commanded to a partially open position; (4) the fans 400 speeds may be set to desired speeds; (5) the reversing valve 600 may be positioned for heating operation; and (6) the compressor assembly 100 may be configured to operate at its lowest speed setting.

With the VRF system 1000 components configured as described, a portion of the refrigerant flow of the VRF system 1000 may be routed through the outdoor coil 300A to induce an artificial heating load. The artificial load induced into the VRF system 1000 may increase total VRF system 1000 heating demand to above the cooling capacity corresponding to operation of the compressor assembly 100 at its lowest speed setting.

At step 203, the controller may monitor the VRF system 1000 during extra low heating or cooling operation, varying the VRF system configuration in response to changes in system demand. The controller 700 may, for example, vary the position of one or both of the metering devices 500 to increase or reduce the rate of refrigerant flow through one or both of the outdoor coils 300. Additionally, or alternatively, the controller 700 may increase or decrease the fans 400 speeds to increase or decrease the heat transfer between the VRF system 1000 refrigerant and ambient outdoor air in any suitable manner.

Further, at step 203, the controller 700 may sense that the extra low heating or cooling demand has ceased. If the extra low heating or cooling demand ceases due to a demand increase to above extra low demand, the controller may continue to control the VRF system 1000 in according to partial load, or full load, operation. The system controller 700 may return to partial load operation by reconfiguring the VRF system 1000 components to remove the artificial heating or cooling load induced during extra low load operation. If the extra low heating or cooling demand ceases due to a decrease in demand to below a threshold demand, the controller 700 may de-energize the VRF system 1000 components to cease all heating or cooling operation.

Figure 3:
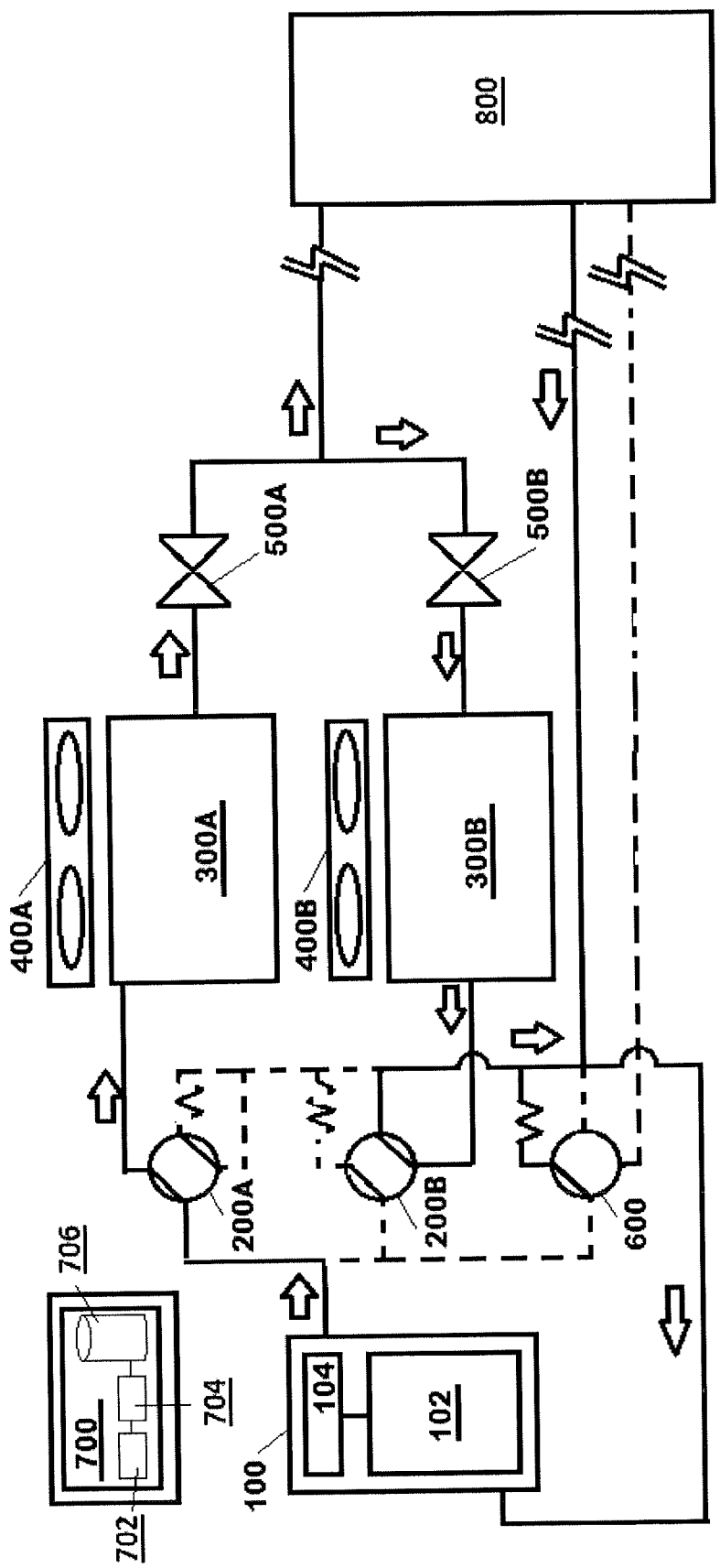
FIG. 3 is a refrigerant flow diagram during operation of a VRF system in low cooling mode.

Turning now to FIG. 3, the VRF system 1000 may operate in response to extra low cooling demand on the VRF system 1000 in accordance with the control method 200 described above. During extra low cooling load operation, the refrigerant flow through the VRF system 1000 may follow the path shown by the arrows of FIG. 3, along the piping route shown in solid lines.

The system controller may set the valve 200A position to route refrigerant from the compressor assembly 100 discharge to the outdoor coil 300A. The metering device 500A may be set to the fully open position. The metering device 500B may be set to a partially open position. In this configuration, the refrigerant may pass through metering device 500A, with some of the refrigerant flow continuing to the indoor sections of the VRF system 1000, including an indoor coil, and some of the refrigerant flow routed through the metering device 500B and through the outdoor coil 300B. The portion of the refrigerant flow passing through the outdoor coil 300B may then be routed through the valve 200B to recombine with the portion of the refrigerant flow returning from the indoor sections of the VRF system 1000. The combined refrigerant may then be piped to the suction port of the compressor assembly 100, completing the circuit.

In extra low cooling mode, as described above, the outdoor coil 300A may function as a condenser while the outdoor coil 300B may function as an evaporator. The outdoor coil 300B may be utilized in this manner as a dummy, or artificial, load upon the VRF system 1000, with the outdoor coil 300B absorbing some of the cooling capacity of the refrigerant flow through the VRF system 1000. The artificial load of the outdoor coil 300B may augment the total VRF system 1000 cooling demand to bring the demand to above the capacity corresponding to that of the VRF system 1000 when operating at the lowest speed setting of the variable speed compressor assembly 100.

Operation in this manner allows for the VRF system 1000 to meet extra low cooling demand that is below the lowest capacity that may be accommodated through a reduction of compressor speed, alone. Additionally, the creation of an artificial load on the VRF system 1000 allows for continuous operation of the compressor assembly 100 at its lowest speed setting while the VRF system 1000 meets the extra low cooling demand, without the need for short cycling of the compressor assembly 100 components.

The controller 700 may control the amount of refrigerant cooling capacity absorbed by the artificial load of the outdoor coil 300B through control of the metering device 500B, for VRF systems 1000 with the metering device 500B being an EXV. The area of the opening through the metering device 500B may be varied by the controller 700 to adjust the amount of refrigerant flow that passes through the metering device 500B and the outdoor coil 300B. The controller 700 may command the metering device 500B towards the fully open position to allow more refrigerant flow to pass to the outdoor coil 300B to increase the artificial load on the VRF system 1000. Alternatively, the controller 700 may command the metering device 500B toward the closed position to reduce the refrigerant flow to the outdoor coil 300B to decrease the artificial load on the VRF system 1000.

The controller 700 may also control the artificial load created through varying the speed of one or more of the fans 400B. The controller 700 may increase the speed of one or more of the fans 400B to increase the heat transfer between the refrigerant flow through the outdoor coil 300B and the ambient outdoor air, increasing the artificial load on the VRF system 1000. The controller 700 may decrease the speed of one or more of the fans 400B to decrease the heat transfer between the refrigerant flow through the outdoor coil 300B and the ambient outdoor air, reducing the artificial load on the VRF system 1000.

In an embodiment, the controller 700 may be configured to control the artificial load created through variation of the either, or both, the position of the metering devices 500 and the speed of one or more fans 400. Those skilled in the art will appreciate that the controller 700 may be configured to position the metering devices 500A and 500B and the valves 200A and 200B to utilize outdoor coil 300A as an evaporator coil inducing an artificial load into the VRF system 1000.

Figure 4:
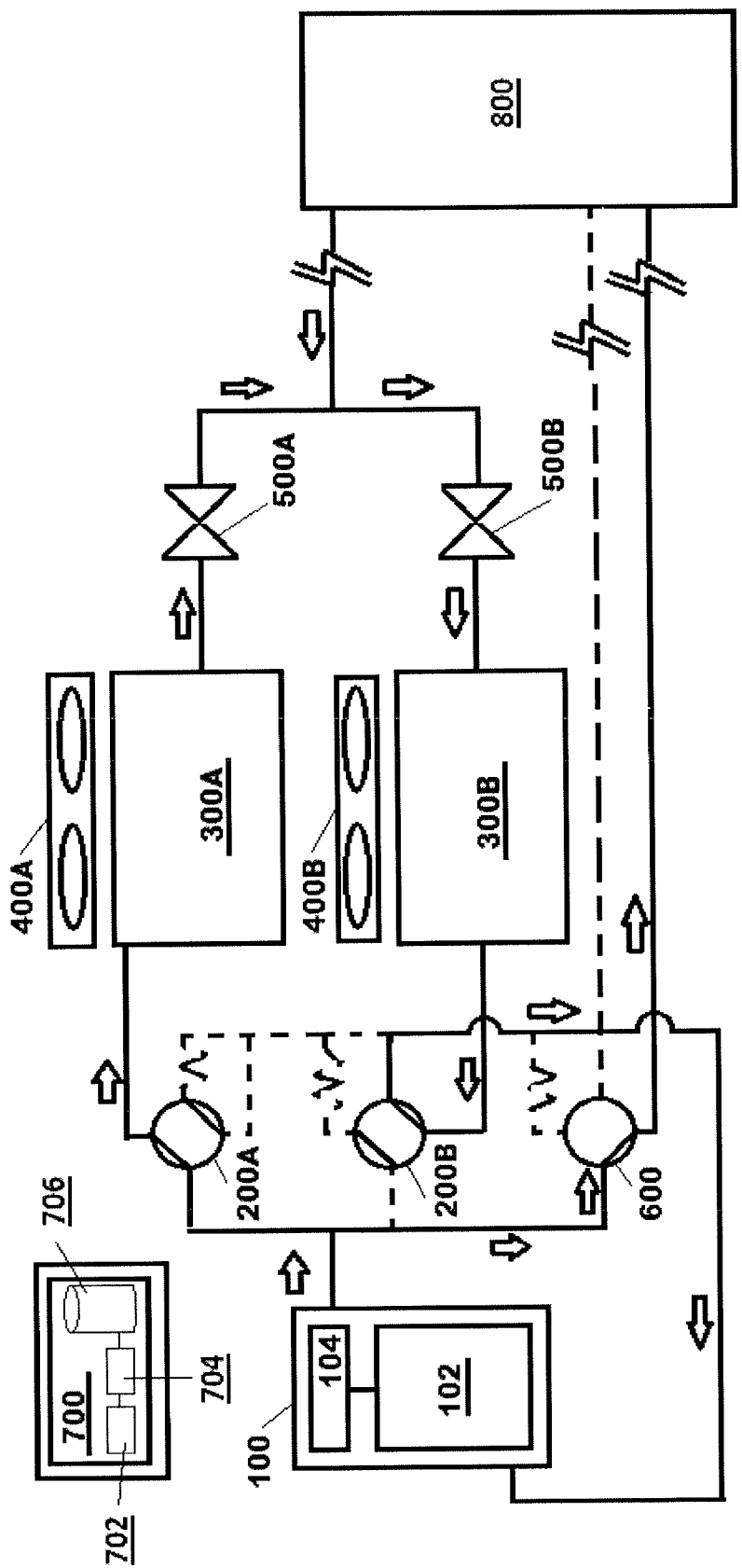
FIG. 4 is a refrigerant flow diagram during operation of a VRF system in low heating mode.

Turning now to FIG. 4, the VRF system 1000 may operate in response to extra low heating demand on the VRF system 1000 in accordance with the control method described above. During extra low heating load operation, the refrigerant flow through the VRF system 1000 may follow the path shown by the arrows of FIG. 4, along the piping route shown in solid lines.

The system controller may set the reversing valve 600 position to reverse the flow of refrigerant through the VRF system 1000, routing the refrigerant from the discharge of the compressor assembly 100 to the indoor sections of the VRF system 1000, such as an indoor coil. The system controller 700 may set the valve 200A position to route some of the refrigerant from the compressor assembly 100 discharge to the outdoor coil 300A.

The metering device 500A may be set to a partially open position, limiting the portion of the VRF system 1000 flowing through the outdoor coil 300A. The metering device 500B may also be set to a partially open position to control the phase change of the refrigerant flow passing through it, in a manner consistent with metering device operation for a heat pump in heating mode. In this configuration, the refrigerant flow from the compressor assembly 100 discharge is routed directly to the indoor sections of the VRF system 1000 with a portion of the refrigerant flow routed through the outdoor coil 300A and the metering device 500A. The divergent flow routes may re-combine at the metering device 500B. The total refrigerant flow may then pass through the outdoor coil 300B and may be routed through the valve 200B to the suction port of the compressor assembly 100, completing the circuit.

In extra low heating mode, as described above, the outdoor coil 300A may function as a condenser while the outdoor coil 300B may function as an evaporator. The outdoor coil 300A may be utilized in this manner as a dummy, or artificial, load upon the VRF system 1000, with the outdoor coil 300A absorbing some of the heating capacity of the refrigerant flow through the VRF system 1000. The artificial load of the outdoor coil 300A may augment the total VRF system 1000 heating demand to bring the demand to above the capacity corresponding to that of the VRF system 1000 when operating at the lowest speed setting of the variable speed compressor assembly 100.

Operation in this manner allows for the VRF system 1000 to meet extra low heating demand that is below the lowest capacity that may be accommodated through a reduction of compressor speed, alone. Additionally, the creation of an artificial load on the VRF system 1000 allows for continuous operation of the compressor assembly 100 at its lowest speed setting while the VRF system 1000 meets the extra low heating demand, without the need for short cycling of the compressor assembly 100 components.

The controller 700 may control the amount of refrigerant heating capacity absorbed by the artificial load induced by the outdoor coil 300A through control of the metering device 500A, for VRF systems 1000 with the metering device 500A being an EXV. The area of the opening through the metering device 500A may be varied by the controller 700 to adjust the amount of refrigerant flow that passes through the metering device 500A. The controller 700 may command the metering device 500A towards the fully open position to allow more refrigerant flow to passing through the outdoor coil 300A to recombine with the refrigerant flow returning from the indoor sections of VRF system 1000 to increase the artificial load on the VRF system 1000. Alternatively, the controller 700 may command the metering device 500A toward the closed position to reduce the refrigerant flow from the outdoor coil 300A that may recombine with the refrigerant returning from the indoor sections of the VRF system 1000 to decrease the artificial load on the VRF system 1000.

The controller 700 may also control the artificial load created through varying the speed of one or more of the fans 400A. The controller 700 may increase the speed of one or more of the fans 400A to increase the heat transfer between the refrigerant flow through the outdoor coil 300A and the ambient outdoor air, increasing the artificial load on the VRF system 1000. The controller 700 may decrease the speed of one or more of the fans 400A to decrease the heat transfer between the refrigerant flow through the outdoor coil 300A and the ambient outdoor air, reducing the artificial load on the VRF system 1000.

In an embodiment, the controller 700 may be configured to control the artificial load created through variation of the either, or both, the position of the metering devices 500 and the speed of one or more fans 400. Those skilled in the art will appreciate that the controller 700 may be configured to position the metering devices 500A and 500B and the valves 200A and 200B to utilize outdoor coil 300B as a condenser coil inducing an artificial load into the VRF system 1000 during extra low heating operation.

Modifications, additions, or omissions may be made to the systems, apparatuses, and processes described herein without departing from the scope of the disclosure. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present disclosure, as defined by the appended claims. To aid the Patent Office, and any readers of any patent issued on this application in interpreting the claims appended hereto, applicants do not intend any of the appended claims to invoke 35 U.S.C. § 112(f) as it exists on the date of filing hereof unless the words "means for" or "step for" are explicitly used in the particular claim.

The invention claimed is:

1. A method of operating a variable refrigerant flow (VRF) system, the method comprising:
   determining that a cooling demand of the VRF system is below a threshold cooling demand;
   in response to determining that the cooling demand is below the threshold cooling demand, generating an artificial cooling load, wherein generating the artificial load comprises:
   operating a first valve to direct refrigerant discharged from a compressor only into a first coil;
   operating a first expansion valve to direct an amount of the refrigerant received from the first coil to a second expansion valve;
   operating the second expansion valve to direct the amount of the refrigerant to a third coil; and
   operating a second valve to direct the amount of refrigerant to flow from the third coil to the compressor.

2. The method of claim 1, wherein the first and third coils are placed outside a building.

3. The method of claim 1, further comprising regulating a speed of the compressor by using a variable speed drive coupled to the compressor.

4. The method of claim 1, further comprising operating one or more fans to blow ambient air across the first coil or the third coil and regulating a speed of the one or more fans based in part on the cooling demand.

5. The method of claim 1, further comprising:
   causing the first coil to function as a condenser; and
   causing the third coil to function as an evaporator.

6. The method of claim 1, further comprising:
   determining that the cooling demand ceases to be below the threshold cooling demand; and
   in response to determining that the cooling demand ceases to be below the threshold cooling demand, de-energizing the VRF system, thereby ceasing cooling operation of the VRF system.

7. The method of claim 1, further comprising, in response to detecting a change in the cooling demand:
   varying a degree of openness of one or both of the first expansion valve and the second expansion valve; and
   varying a speed of a fan configured to direct air across the third coil, thereby adjusting heat transfer between the third coil and the air and a magnitude of the artificial load.

8. The method of claim 1, wherein generating the artificial cooling demand further comprises;
   directing a second amount of the refrigerant received from the first coil to a second coil; and
   directing the second amount of the refrigerant from the second coil to the compressor.

9. A method of operating a variable refrigerant flow (VRF) system, the method comprising:
   determining that a cooling demand of the VRF system is below a threshold cooling demand;
   in response to determining that the cooling demand is below the threshold cooling demand, generating an artificial cooling load, wherein generating the artificial load comprises:
   operating a first valve to direct refrigerant discharged from a compressor only into a first coil;
   operating a first expansion valve to direct an amount of the refrigerant received from the first coil to a second coil, wherein the second coil is coupled to the compressor and at least a portion of the amount of the refrigerant received by the second coil flows from the second coil to the compressor.

10. The method of claim 9, wherein the second coil is placed inside a building and the first coil is placed outside the building.

11. The method of claim 9, further comprising regulating a speed of the compressor by using a variable speed drive coupled to the compressor.

12. The method of claim 9, further comprising operating one or more fans to blow ambient air across the first coil and regulating a speed of the one or more fans based in part on the cooling demand.

13. The method of claim 9, further comprising:
causing the first coil to function as a condenser; and
causing the second coil to function as an evaporator.

14. The method of claim 9, further comprising:
determining that the cooling demand ceases to be below the threshold cooling demand; and
in response to determining that the cooling demand ceases to be below the threshold cooling demand, de-energizing the VRF system, thereby ceasing cooling operation of the VRF system.

15. The method of claim 9, further comprising, in response to detecting a change in the cooling demand:
varying a degree of openness of the first expansion valve.

16. A variable refrigerant flow (VRF) system, the system comprising:
a compressor operable to compress refrigerant;
a first valve;
a first expansion valve;
a second valve;
a second expansion valve; and
a controller, wherein, in response to determining that a cooling demand of the VRF system is below a threshold cooling demand, the controller is operable to generate an artificial load by:
operating the first valve to direct refrigerant discharged from the compressor only into a first coil;
operating the first expansion valve to direct an amount of the refrigerant received from the first coil to the second expansion valve;
operating the second expansion valve to direct the amount of the refrigerant to a third coil; and
operating the second valve to direct the amount of refrigerant to flow from the third coil to the compressor.

17. The VRF system of claim 16, wherein the first and third coils are placed outside a building.

18. The VRF system of claim 16, further comprising a variable speed drive coupled to the compressor, wherein the controller is further operable to regulate a speed of the compressor by operating the variable speed drive.

19. The VRF system of claim 16, wherein the controller is further operable to operate one or more fans to blow ambient air across the first coil or the third coil and to regulate a speed of the one or more fans based in part on the cooling demand.

20. The VRF system of claim 16, wherein the first coil is configured as a condenser and the third coil is configured as an evaporator.

* * * * *